(12) United States Patent
    Pavlik

(10) Patent No.: US 9,040,151 B2
(45) Date of Patent: May 26, 2015

(54) ULTRA-STIFF COEXTRUDED SHRINK FILMS

(71) Applicant: Dow Global Technologies LLC, Midland, MI (US)

(72) Inventor: Martin Pavlik, Wadenswil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/669,557

(22) Filed: Nov. 6, 2012

(65) Prior Publication Data

US 2014/0127489 A1      May 8, 2014

(51) Int. Cl.
    *B32B 7/02*      (2006.01)
    *B32B 27/32*     (2006.01)

(52) U.S. Cl.
    CPC ............ *B32B 7/02* (2013.01); *Y10T 428/24992* (2015.01); *B32B 27/32* (2013.01)

(58) Field of Classification Search
    USPC .................... 428/218; 526/348; 264/176.1
    See application file for complete search history.

(56) References Cited

U.S. PATENT DOCUMENTS

| | | | |
|---|---|---|---|
| 3,645,992 A | 2/1972 | Elston | |
| 3,914,342 A | 10/1975 | Mitchell | |
| 4,076,698 A | 2/1978 | Anderson et al. | |
| 4,599,392 A | 7/1986 | McKinney et al. | |
| 5,272,236 A | 12/1993 | Lai et al. | |
| 5,278,272 A | 1/1994 | Lai et al. | |
| 5,582,923 A | 12/1996 | Kale et al. | |
| 5,733,155 A | 3/1998 | Sagawa et al. | |
| 5,814,399 A * | 9/1998 | Eichbauer | 428/220 |
| 5,854,045 A | 12/1998 | Fang et al. | |
| 7,422,786 B2 | 9/2008 | Ravel et al. | |
| 2006/0057410 A1 | 3/2006 | Saavedra et al. | |
| 2010/0316869 A1 | 12/2010 | Shelley et al. | |
| 2011/0041460 A1* | 2/2011 | Weisinger et al. | 53/441 |
| 2011/0070418 A1* | 3/2011 | Ellingson et al. | 428/218 |
| 2011/0165395 A1* | 7/2011 | Van Hoyweghen et al. | 428/218 |
| 2012/0100356 A1 | 4/2012 | Ohlsson et al. | |

FOREIGN PATENT DOCUMENTS

| | | |
|---|---|---|
| EP | 1529633 A1 | 5/2005 |
| EP | 1813423 A1 | 8/2007 |
| WO | 2010046098 A1 | 4/2010 |

OTHER PUBLICATIONS

Search Report and Written Opinion for PCT/US2013/068367, Mail Date Feb. 6, 2014, 12 Pages.
Alberto Ronzani, Exploiting multilayer flexibility for high performance Polyethylene films, Retrieved from the Internet: URL:http://www.slideshare.net/ronzania/aronzani-sabic-presentation-multilayer-packaging-films-25-november-linked, Jan. 30, 2014, pp. 15-17.

* cited by examiner

*Primary Examiner* — Aaron Austin
*Assistant Examiner* — Jasper Saberi

(57) ABSTRACT

The present invention generally pertains to multilayer film including four or more discrete layers. The films contain two external layers, an internal stiffening layer and an internal shrink layer. The external layers include linear low density polyethylene resin, the stiffening layer includes polypropylene or a high density polyethylene and the shrink layer includes low density polyethylene. The multilayer films of the present invention have a gloss of at least 62% at 45 degrees, together with a 2% secant tensile modulus greater than 400 MPa.

17 Claims, No Drawings

ULTRA-STIFF COEXTRUDED SHRINK FILMS

FIELD OF THE INVENTION

The present invention generally pertains to multilayer film comprising four or more discrete layers. The films contain two external layers, an internal stiffening layer and an internal shrink layer. The external layers comprise linear low density polyethylene resin, the stiffening layer comprises polypropylene or a high density polyethylene and the shrink layer comprises low density polyethylene. The multilayer films of the present invention are characterized by having a gloss of at least 62% at 45 degrees, together with a 2% secant tensile modulus greater than 400 MPa.

BACKGROUND AND SUMMARY OF THE INVENTION

Currently, top performance shrink films used for demanding collation applications are manufactured by blown film process and typically comprise 3 layers. The two skin layers are usually based on blends of majority of Linear Low Density Polyethylene (LLDPE) (often metallocene single-site catalyzed Linear Low Density Polyethylene (m-LLDPE)) with Low Density Polyethylene (LDPE). The central layer typically contains fractional melt Melt index Low Density Polyethylene (MI LDPE) occasionally blended with High Density Polyethylene (HDPE). Increasing demand for higher modulus films that would allow for down gauging of today's typical 45 micron collation shrink films down to 35 microns or less has arisen. Such a significant increase in modulus cannot be addressed by known resins combined with existing formulations and existing 3 layer coex technology. While converters currently attempt to increase modulus by increasing the content of stiff resins (mainly HDPE and occasionally PP), there are limitations to this approach in terms of minimizing resin usage and detrimentally effecting other properties.

However, it has been discovered that 5-layer machinery which has become more prevalent in the industry together with innovative film formulations may be used to achieve films to meet these sustainability goals. Accordingly, one aspect of the present invention is a multilayer film which can be downguaged to 40 microns or less and yet still has good stiffness and adequate shrink properties.

Thus, a first aspect of the present invention is a multilayer film comprising four or more discrete layers. The film comprises a first and a second external layer, at least one stiffening layer and at least one shrink layer. Each external layer independently comprises from 60 to 100% by weight of the external layer of a linear low density polyethylene resin characterized by having a melt index in the range of 0.3 to 4 g/10 min and a density in the range of from 0.917 to 0.950 g/cm³, and a polydispersity of from 3 to 9.

The required stiffening layer comprises from 60 to 100% by weight of the stiffening layer of a stiffening resin selected from the group consisting of 1) a polypropylene resin, wherein said polypropylene resin is selected from the group consisting of homopolymer polypropylene and a propylene random copolymer derived from more than 90% by weight propylene and up to 10% by weight ethylene or one or more alpha olefins having 4 to 10 carbon atoms, wherein the polypropylene resin is characterized by having a melt flow rate in the range of 0.1 to 1 g/10 min; and 2) a high density polyethylene resin characterized by having a melt index in the range of 0.25 to 4 g/10 min and a density in the range of from 0.935 to 0.975 g/cm³; and 3) blends thereof.

The required shrink later comprises from 50 to 100% by weight of the shrink layer of a high pressure low density polyethylene resin characterized by having a melt index in the range of 0.2 to 1 g/10 min and a density in the range of from 0.917 to 0.935 g/cm³.

The films of this aspect of the invention can be characterized by having a gloss of at least 62% at 45 degrees, together with a 2% secant tensile modulus greater than 400 MPa in the machine direction, the cross direction or both the machine direction and the cross direction. Preferably such films have a total thickness of 40 microns or less.

DETAILED DESCRIPTION OF THE INVENTION

Definitions and Test Methods

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE) as well as linear polyethylene. Linear polyethylene includes Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). LDPE resins typically have a density in the range of 0.916 to 0.940 g/cm3.

The term "LLDPE", includes both resin made using the traditional Ziegler-Natta catalyst systems as well as single-site catalysts such as metallocenes (sometimes referred to as "m-LLDPE"). LLDPEs contain less long chain branching than LDPEs and includes the substantially linear ethylene polymers which are further defined in U.S. Pat. Nos. 5,272, 236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The Linear PE can be made via gas-phase, solution-phase or slurry polymerization or any combination thereof, using any type of reactor or reactor configuration known in the art, with gas and solution phase reactors being most preferred.

The term "HDPE" refers to polyethylenes having densities greater than about 0.940 g/cm3, which are generally prepared with Ziegler-Natta catalysts, chrome catalysts or even metallocene catalysts.

"Polypropylene" shall mean polymers comprising greater than 50% by weight of units which have been derived from propylene monomer.

"Multimodal" means resin compositions which can be characterized by having at least two distinct peaks in a GPC chromatogram showing the molecular weight distribution. Multimodal includes resins having two peaks as well as resins having more than two peaks.

The following analytical methods are used in the present invention:

Density is determined in accordance with ASTM D792.

"Melt index" also referred to as "$I_2$" is determined according to ASTM D1238 (190° C., 2.16 kg). Melt Index is generally used for polyethylene based polymers.

"Melt Flow Rate" also referred to as "MFR" is determined according to ASTM D1238 (230° C., 2.16 kg). Melt Flow Rate is generally used for polypropylene based polymers.

The term polydispersity is the same as molecular weight distribution or "MWD" and is defined as the ratio of weight average molecular weight to number average molecular weight ($M_w/M_n$). $M_w$ and $M_n$ are determined according to methods known in the art using conventional gel permeation chromatography (GPC).

Total (Overall) Haze and Internal Haze: Internal haze and total haze are measured according to ASTM D 1003-07.

45° Gloss is determined according to ASTM D2457-08 (average of five film samples).

2% Secant Modulus—MD (machine direction) and CD (cross direction) is determined according to ISO 527-3 (average of five film samples in each direction).

Shrinkage is determined in the machine direction and the cross direction according to ISO 11501.

Puncture resistance is determined according to ASTM D-5748.

Film

The films of the present invention are multilayer films comprising four or more discrete layers. The films comprise a first and a second external layer, at least one stiffening layer and at least one shrink layer. It is preferred that the films have a total thickness of 40 microns or less, preferably 35 microns or less. While there is no minimum thickness contemplated for the films of the present invention, practical considerations of current manufacturing equipment suggests that the minimum thickness will be at least 8 micron.

It should be understood that while the film must have a minimum of 4 layers, it may have more than that. In particular, the film structures of the present invention may include additional stiffening layers, additional shrink layers, or additional layers which are neither shrink nor stiffening layers. Such additional layers may, for example, impart different functionality such as barrier layers, or tie layers, as is generally known in the art. One preferred embodiment is a 5 layer film having an external layer, a stiffening layer, a shrink layer, a second stiffening layer and a second eternal layer.

The films of this aspect of the invention can be characterized by having a gloss of at least 60% at 45 degrees, preferably at least 65%, together with a 2% secant tensile modulus greater than 400 MPa in the machine direction or the cross direction or both the machine direction and the cross direction, preferably at least 450 MPa. It is preferred that the films of the present invention have a total haze of less than 10%.

The films of the present invention preferably have an average shrink in the machine direction of from 40 to 90%, preferably from 50 to 70%, and an average shrink in the cross direction of from 0 to 25%, preferably from 5 to 20%.

The films of the present invention also preferably have a puncture resistance of at least 2 J/cm$^3$, more preferably at least 3 J/cm$^3$.

The films of the present invention can advantageously be used for any purpose generally known the art. Such uses may include, but are not limited to, clarity shrink films, collation shrink films, shrink hooder films, heavy duty shipping sacks, block bottom bag and stand-up pouch films, liner films, machine direction oriented films, and diaper compression packaging bags. Different methods may be employed to manufacture such films. Suitable conversion techniques include, but are not limited to, blown film process, cast film process, vertical or horizontal form fill and seal process. Such techniques are generally well known. In one embodiment, the conversion technique includes, but is not limited to, the blown film process.

External Layers

Each external layer of the films independently comprises from 60 to 100% by weight of the external layer, of a linear low density polyethylene (LLDPE) resin characterized by having a melt index in the range of 0.3 to 4 g/10 min, preferably 1 to 2 g/10 min and a density in the range of from 0.915 g/cm$^3$ to 0.950 g/cm$^3$, preferably 0.919 to 0.935 and a MWD of from 3 to 9, preferably 3.2 to 4. This LLDPE is preferably produced using a Ziegler-Natta catalyst technology as is generally known in the art.

Optionally, the external layer or layers of the films of the present invention may also comprise from 0 to 40% (by weight of the external layer) of a first high pressure low density polyethylene resin characterized by having a melt index in the range of 0.25 g/10 min to 4 g/10 min, preferably 0.3 to 1 g/10 min and a density in the range of from 0.918 to 0.935 g/cm$^3$, preferably in the range of from 0.923 to 0.928 g/cm$^3$.

While not mandatory, it may be preferred for many applications that the same resin composition be used for each of the external layers. It is preferred that each external layer comprises from 5 to 25% of the total thickness of the film, preferably from 8 to 12.5%.

Stiffening Layer(s)

The required stiffening layer comprises from 60 to 100% (by weight of the stiffening layer) of a stiffening resin. For purposes of the present invention, a "stiffening resin" is defined to be one selected from the group consisting of polypropylene resin, high density polyethylene (HDPE) resin or blends thereof. The polypropylene resin can be homopolymer polypropylene ("hPP") or a propylene random copolymer ("RCP"). If an RCP is used, it is preferred that the comonomer be derived from more than 90% by weight propylene units. The remaining portion of the RCP (that is, up to 10% by weight) is derived from ethylene or one or more alpha olefins having 4 to 10 carbon atoms. Whether hPP or RCP, or a blend thereof is used, it is preferred that the polypropylene resin has a melt flow rate in the range of 0.1 to 2 g/10 min, preferably from 0.5 to 1.5 g/10 min.

If an HDPE resin is used, it is preferred that it has a melt index in the range of 0.1 g/10 min to 4 g/10 min, preferably 0.25 to 2 g/10 min and a density in the range of from 0.935 to 0.975 g/cm$^3$, preferably 0.945 to 0.965 g/cm$^3$. It is also contemplated that each stiffening layer may comprise a blend of different HDPEs.

The stiffening layer may comprise a single polymer as described above or may be a blend of two or more of these polymers. Additionally, it is contemplated that any stiffening layer may also comprise up to 40% (by weight of the stiffening layer) of polymer or polymer blend that is not a stiffening resin, although for many embodiments, it will be preferred that 100% of the resin used in the stiffening layer be stiffening resin.

Whether as a single layer or multiple layers, it is preferred that the stiffening layers comprise from 20 to 70% by weight, preferably 35 to 50% by weight of the overall film structure. In some applications it may be preferred that the film comprise at least 40% by weight of the film structure.

In a preferred 5 layer structure having 2 stiffening layers, it is preferred for many applications that each of the stiffening layers be comprised of the same resin formulation.

Shrink Layer(s)

The required shrink layer comprises from 50 to 100% (by weight of the shrink layer) of a high pressure low density polyethylene resin characterized by having a melt index in the range of 0.2 to 1 g/10, preferably 0.3 to 0.6 min and a density in the range of from 0.917 to 0.935 g/cm$^3$, preferably 0.925 to 0.928 g/cm$^3$. This second LDPE may be the same or be different from the optional first LDPE described for use in the external layers. In many applications it may be preferred that the resin used for the shrink layer comprise 100% of high pressure low density polyethylene resin.

In some applications it may be preferred that the shrink layer further comprise from 0 to 50% of a second linear high density polyethylene resin characterized by having a melt index in the range of 0.2 g/10 min to 4 g/10 min preferably 0.5 to 1 g/10 min and a density in the range of from 0.930 to 0.975 g/cm$^3$, preferably 0.935 to 0.965 g/cm$^3$. This second linear high density polyethylene resin may be the same or different from optional first linear high density polyethylene resin described for the stiffening layer. Adding linear high density polyethylene resin to the shrink layer may be especially preferred when it is desired to impart additional deformation resistance to the film.

Whether as a single layer or multiple layers, it is preferred that the shrink layers comprise from 30 to 70% of the total thickness of the film, preferably 35 to 50%.

EXAMPLES

The following resins were used to make films to demonstrate the effectiveness of the present invention:

Resin A is a LLDPE having a density of 0.935 g/cm$^3$, a melt index of 1.7 g/10 min, and an MWD of 3.4.

Resin B is a LLDPE having a density of 0.935 g/cm$^3$, a melt index of 0.5 g/10 min, and an MWD of 3.1.

Resin C is a high pressure low density polyethylene resin having a density of 0.925 g/cm$^3$ and a melt index of 1 g/10 min.

Resin D is is a linear high density polyethylene resin having a density of 0.960 g/cm$^3$ and a melt index of 0.29 g/min.

Resin E is is a linear high density polyethylene resin having a density of 0.956 g/cm$^3$ and a melt index of 2 g/min Resin F is is a linear high density polyethylene resin having a density of 0.955 g/cm$^3$ and a melt index of 4 g/min Resin G is a high pressure low density polyethylene resin having a density of 0.926 g/cm$^3$ and a melt index of 0.3 g/10 min.

The resins are used to make coextruded films of an A/B/C/B/A (or an A/B/A structure for the comparative example), using the resin components as indicated in the table below.

Example 01 (comparative; industrial like benchmark)

A/B/A; 20/60/20
A: 20% RESIN C + 80% RESIN A
B: 100% RESIN G

Example 02

A/B/C/B/A; 10/20/40/20/10
A: 20% RESIN C + 80% RESIN A
B: 100% RESIN F
C: 100% RESIN G

Example 03

A/B/C/B/A; 10/20/40/20/10
A: 20% RESIN C + 80% RESIN A
B: 100% RESIN E
C: 100% RESIN G

Example 04

A/B/C/B/A; 10/20/40/20/10
A: 20% RESIN C + 80% RESIN A
B: 100% RESIN D
C: 100% RESIN G

Example 05

A/B/C/B/A; 10/20/40/20/10
A: 20% RESIN C + 80% RESIN A
B: 80% RESIN D + 20% RESIN B
C: 60% RESIN G + 40% RESIN B

In each case the total film thickness was 35 microns with the breakdown among the layers of 10%/20%/40%/20%/10%. The films are evaluated for 2% secant modulus, 45° gloss, haze, shrinkage, and puncture resistance. The results are included in the table below.

| | Example 01 (comparative) | Example 02 | Example 03 | Example 04 | Example 05 |
|---|---|---|---|---|---|
| Gloss 45dg [%] | 64.9 | 63.4 | 71.0 | 61.4 | 67.9 |
| Total Haze [%] | 7.5 | 10.7 | 7.5 | 10.1 | 8.9 |
| 2% Sec Mod CD [MPa] | 283 | 399 | 382 | 491 | 473 |
| 2% Sec Mod MD [MPa] | 229 | 326 | 313 | 378 | 363 |
| Average Shrink - CD [%] | 8 | 9 | 7 | 11 | 7 |
| Average Shrink - MD [%] | 74 | 32 | 47 | 43 | 74 |
| Puncture Resistance [J/cm$^3$] | 3.4 | 2.1 | 2.4 | 2.6 | 4.5 |

What is claimed is:

1. A multilayer film comprising four or more discrete layers comprising:
   a. a first and a second external layer, wherein each external layer independently comprises:
      i. from 60 to 100% by weight of the external layer of a linear low density polyethylene resin characterized by having a melt index in the range of 0.3 to 4 g/10 min and a density in the range of from 0.917 to 0.950 g/cm$^3$, and a MWD of from 3 to 9 and
      ii. from 0 to 40% by weight of the external layer of a first high pressure low density polyethylene resin characterized by having a melt index in the range of 0.3 to 4 g/10 min and a density in the range of from 0.918 to 0.935 g/cm$^3$;
   b. at least one internal stiffening layer, wherein the stiffening layer or layers cumulatively comprise at least 20% of the film by weight and wherein each stiffening layer independently comprises:

i. from 60 to 100% by weight of the stiffening layer of a stiffening resin selected from the group consisting of 1) a polypropylene resin, wherein said polypropylene resin is selected from the group consisting of homopolymer polypropylene and a propylene random copolymer derived from more than 90% by weight propylene and up to 10% by weight ethylene or one or more alpha olefins having 4 to 10 carbon atoms, wherein the polypropylene resin is characterized by having a melt flow rate in the range of 0.1 to 2 g/10 min; and 2) a first linear high density polyethylene resin characterized by having a melt index in the range of 0.25 to 4 g/10 min and a density in the range of from 0.935 to 0.975 g/cm$^3$; and 3) blends thereof, and;

c. at least one internal shrink layer, wherein each shrink layer independently comprises:
i. from 50 to 100% by weight of the shrink layer of a second high pressure low density polyethylene resin characterized by having a melt index in the range of 0.2 to 1 g/10 min and a density in the range of from 0.917 to 0.935 g/cm$^3$; and
ii. from 0 to 50% of a second linear high density polyethylene resin characterized by having a melt index in the range of 0.2 to 4 g/10 min and a density in the range of from 0.930 to 0.975 g/cm$^3$;

wherein the multilayer film is characterized by having a gloss of at least 60% at 45 degrees, together with a 2% secant tensile modulus greater than 400 MPa in the machine direction, the cross direction or both the machine direction and the cross direction.

2. The multilayer film of claim 1 where the film comprises at least 5 layers, two of which are stiffening layers.

3. The multilayer film of claim 2 wherein each external layer comprises the same material and each stiffening layer comprises the same material.

4. The multilayer film of claim 1 wherein the first high pressure low density polyethylene resin and the second high pressure low density polyethylene resin are the same.

5. The multilayer film of claim 1 wherein the first high pressure low density polyethylene resin in the external layer has a melt index in the range of 0.8 to 1.5 g/10 min.

6. The multilayer film of claim 1 wherein the high pressure low density polyethylene resin in the external layer has a density in the range of from 0.923 to 0.928 g/cm$^3$.

7. The multilayer film of claim 1 wherein the resin used in each internal stiffening layer comprises only the stiffening resin.

8. The multilayer film of claim 1 wherein the polypropylene has a melt flow rate in the range of from 0.5 to 1.5 g/10 min.

9. The multilayer film of claim 1 wherein the resin used in each internal shrink layer comprises only the second high pressure low density polyethylene.

10. The multilayer film of claim 1 wherein the multilayer film has a total thickness of less than or equal to 35 microns.

11. The multilayer film of claim 1 wherein each external layer comprises 5 to 25% of the total thickness of the film.

12. The multilayer film of claim 1 wherein the stiffening layer or layers collectively comprise from 20 to 60% of the total thickness of the film.

13. The multilayer film of claim 1 wherein the shrink layer or layers collectively comprise from 30 to 70% of the total thickness of the film.

14. The multilayer film of claim 1 further characterized by having a total haze less than 10%.

15. The multilayer film of claim 1 further characterized by having an average shrink in the machine direction of from 40 to 90%.

16. The multilayer film of claim 1 further characterized by having an average shrink in the cross direction of from 0 to 25%.

17. The multilayer film of claim 1 further characterized by having a puncture resistance of at least 2 J/cm$^3$.

* * * * *